United States Patent [19]

Günther

[11] Patent Number: 5,759,595
[45] Date of Patent: Jun. 2, 1998

[54] HOT RUNNER NOZZLE

[75] Inventor: Herbert Günther, Allendorf, Germany

[73] Assignee: Gunther Heisskanaltechnik GmbH, Frankenberg, Germany

[21] Appl. No.: 590,408

[22] Filed: Jan. 25, 1996

[30] Foreign Application Priority Data

Jan. 31, 1995 [DE] Germany ................. 295 01 450.4

[51] Int. Cl.$^6$ ................................................. B29C 45/20
[52] U.S. Cl. .................................. 425/549; 264/328.15
[58] Field of Search .......................... 425/549, 568; 264/328.15

[56] References Cited

U.S. PATENT DOCUMENTS

| | | |
|---|---|---|
| 3,091,812 | 6/1963 | Witkowski . |
| 4,586,887 | 5/1986 | Gellert ................. 425/549 |
| 4,663,811 | 5/1987 | Gellert ................. 425/549 |
| 5,569,475 | 10/1996 | Adas et al. ............ 425/549 |

FOREIGN PATENT DOCUMENTS

A-2 716 950 1/1978 Germany .
A-7 900 927 8/1980 Netherlands .

OTHER PUBLICATIONS

Webster's Ninth New Collegiate Dictionary, p. 175, 1986.

*Primary Examiner*—Tim Heitbrink
*Attorney, Agent, or Firm*—Lowe, Price, LeBlanc & Becker

[57] ABSTRACT

A hot runner (10) with an externally heated material pipe (16) and die tip (26) comprises a pre-mounted heating unit (20) with a sealing body (24) which supports a pipe (40) for a heat sensor (34) in a circumferential segment (46). The sealing body (24) made in particular of brass encloses concentrically an insulated heating coil (23) in a steel pipe (22) which is mechanically protected by a partly sleeve-shaped retaining element (42). For example the sensor pipe (40) is supported in the sealing body (24) and is positively and/or adhesively retained between the edges of peripheral ends of a perforated sheet (42). The steel pipe 22) has a lateral recess (44) for inserting the connection points (36) of the heat sensor (34). The material pipe (16) is insertable into the heating device (20) and is able to conduct heat with the close positioning of its shaft (17) against the inner wall (25).

19 Claims, 2 Drawing Sheets

HOT RUNNER NOZZLE

BACKGROUND OF THE INVENTION

The present invention generally relates to a hot runner.

A series of externally heated hot runners have been available for a long time, for example IN U.S. Pat. No. 3,091,812 of DE-A-2 716 9050. Proposals for the installation of heat sensors were made relatively early, e.g., NL-A-7 900 927. In some cases expensive heating coils were provided. However, the connection points and insulation of such coils can be problematical. In addition, the heat generated by such devices was mostly concentrated on the inside and heat escaped at the die tip through the cooler mould cavity, thereby reducing the sprue quality of the article produced.

SUMMARY OF THE INVENTION

The objective of the present invention is to create an improved hot runner which not only provides effective heating up to the region of the die tip but also permits a simplified, reliable and protected attachment of a heat sensor thereto. The hot runner according to the invention will thus be economical to produce and easy to assemble.

The main features of the invention are described in the specification and recited in the claims appended hereto.

In a hot runner with an externally heated material pipe (i.e., feed tube) which is insertable into a housing and comprises a die tip at the bottom end and a heat sensor guided to this region, in which the heat sensor and the heating system are provided laterally with electric connection points, according to one aspect of the invention, the heating system is designed as a pre-mounted heating unit with a sealing body. This construction makes it possible to assemble the hot runner as a stable unit in such a way as to save space and time. At the same time good heat transfer, and thereby high operational effectiveness, is ensured.

In accordance with another feature of the invention, the sealing body supports a sensor pipe accommodating the heat sensor, in particular in a circumferential segment of the sealing body. In this way, excellent mechanical protection and an easy method of assembly is provided.

According to another feature of the invention, the sealing body is preferably made of brass and encloses an insulated heating coil inside a steel pipe which can be centered in the sealing body by a retaining element having a partial sleeve-shape. Preferably, the heating unit is a pipe body whose inner wall forms a support wall for a heating coil mechanically protected thereby.

According to another feature of the invention, the steel pipe has a lateral recess for inserting the connection points of the heat sensor. Still further, the sensor pipe of the inventive structure is preferably supported positively and/or adhesively in the sealing body, for example between the edges of the peripheral ends of a perforated sheet. This arrangement ensures that the heating coil is positioned outside the lateral recess and the sensor pipe.

According to another aspect of the invention, the material pipe is insertable into the heating unit so as to conduct heat, a shaft of the material pipe being positioned closely against the inner wall of the heating unit. In this way, a simple plug-in assembly with excellent heat transfer is formed.

The connection points of the heating unit and heat sensor are arranged above one another according to another feature of the invention, so that the pipe can be plugged in a single step into the housing provided for this purpose with a lateral recess, namely by insertion in an axial direction.

In a further development of the invention the heating unit is held by a centering screw or a centering sleeve on the housing. Only this component would need to be replaced to obtain a different embodiment adapted to the respective installation conditions.

Further features, details and advantages of the invention are described in the claims and in the following description of embodiments with reference to the drawings.

BRIEF DESCRIPTION OF THE DRAWINGS

FIG. 2b is a view from above of the heating unit of FIG. 2a, and

FIG. 2c is a partial front elevation of FIG. 2a.

DESCRIPTION OF A PREFERRED EMBODIMENT OF THE INVENTION

Figure 1:
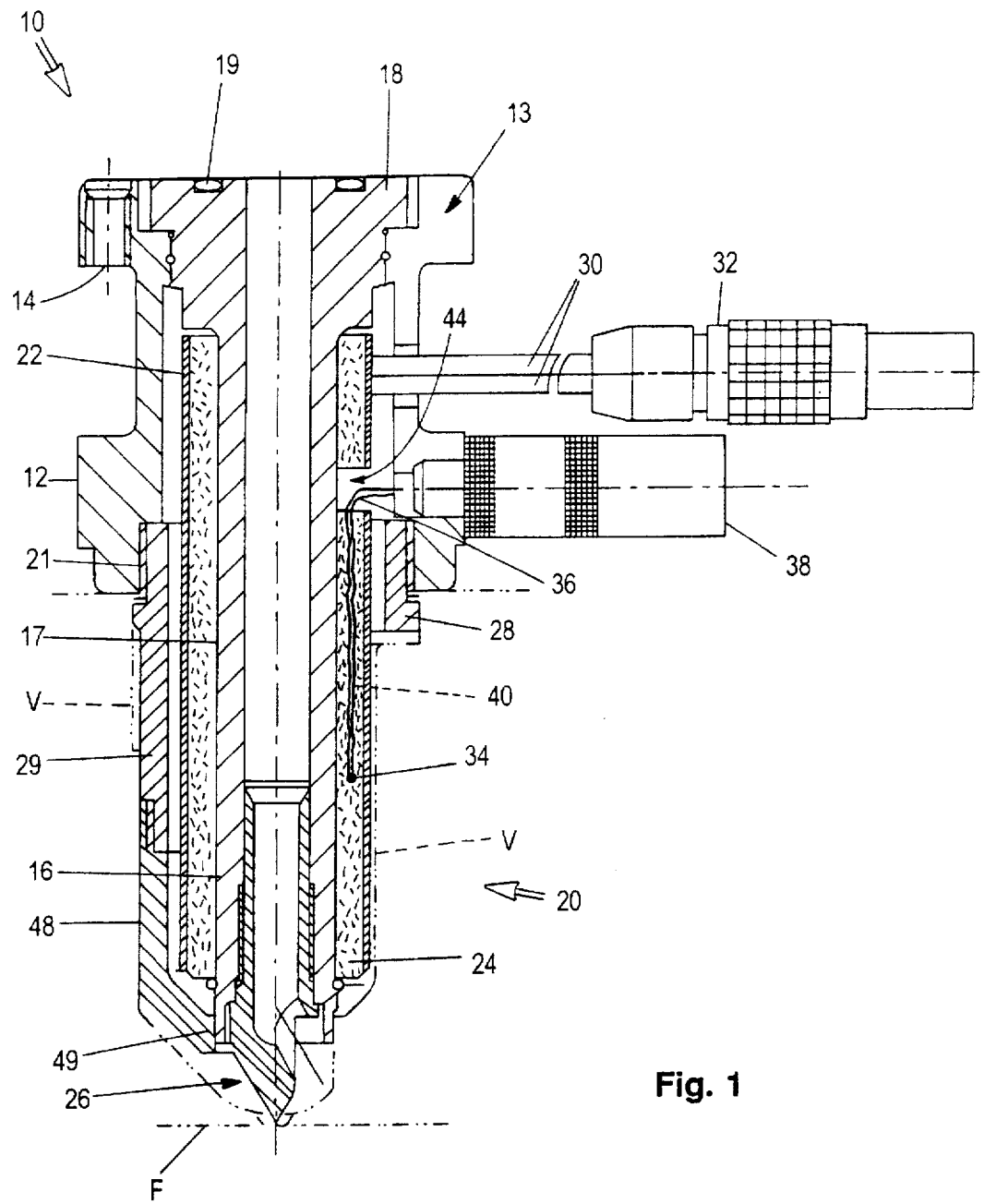
FIG. 1 shows an axial cross section of two designs of a hot runner.

The hot runner is referred to as a whole by the number 10 and comprises a housing 12 with a recess 13 and screw holes 14. A material pipe (or feed tube) 16 is insertable into the housing 12 so that its head 18 closes flush at the top, which head has a sealing ring 19 for connecting to a distributor (not shown).

The material pipe 16 is inserted into a heating unit 20 having a steel pipe 22, in which there is a heating coil 23 (FIG. 2a) inside a sealing body 24. The coil 23 is centered by an inserted perforated sheet 42, which when manufactured is a solid block with the brass sealing material until the block is bored out concentrically to form an inner wall 25. The inner wall holds the long shaft 17 of the material pipe 16 into which a die tip 26 is inserted at the bottom, preferably by a screw. The die tip 26 continues the heating channel up to the plane of a die cavity F indicated by a dash-dot line.

The heating coil 23 is provided with connection points 30 which are mounted in a connector 32 and are intended for connection to a power supply (not shown). The connection points 30 are insulated and pass at a lateral recess 31 out of the heating unit 20 without making contact with the housing.

Figure 2B:
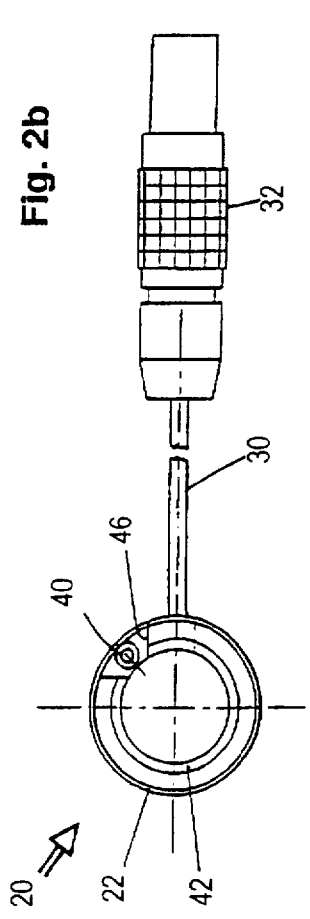
Figure 2A:
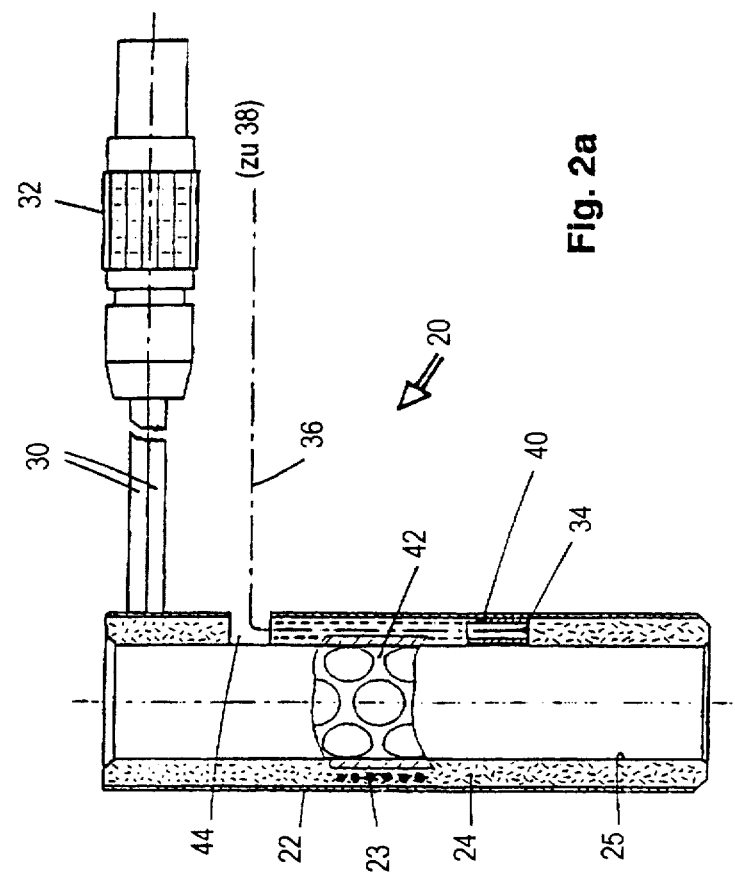
FIG. 2a is a side view of a heating unit, partly in cross section.
Figure 2C:
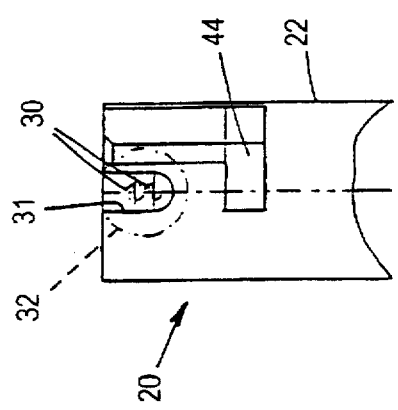

An L-shaped recess 44 is provided in the steel pipe 22 (FIG. 2c), which is for guiding the connection points 36 of a heat sensor 34 in the heating unit 20 downwards from a connector 38. The heating unit includes a sensor pipe 40 which is positioned in a segment 46 forming a chamber, i.e., between the peripheral ends of the perforated sheet 42 as shown in FIG. 2b. The arrangement in FIG. 2c is off-set by 45°, as seen in comparison with the positionally correct arrangement of FIG. 2b. It can be seen from this that the perforated sheet 42 forms an open hollow cylinder whereby the segment 46 is provided as a chamber in which the sensor pipe 40 is located. It can be gripped from the side by the peripheral ends of the perforated sheet 42 which can be edged for this purpose. In the sensor pipe 40 the heat sensor 34 extends to the die tip 26 as far as permitted by the space required by the heating coil 23.

The heating unit 20 can be supported by means of a centering screw 28 (FIG. 1 right) or a centering sleeve 29 (FIG. 1 left) on the housing 12 by a screw connection 21. The design chosen depends on the form of a prechamber bush V indicated by dash dot lines which can be selected for installation into a tool (not shown). Whereas the construction with a short centering screw 28 leaves the bottom region of the heating unit 20 free, in the construction with the centering sleeve 29 a shaft foot 48 connects thereto, the bottom end 49 of which guides the shaft 17 of the material pipe 16 in the region of the die tip 26.

It can be seen that the heating device 20 forms a very stable connecting body in which the heat sensor 34 is arranged in a mechanically protected fashion. The main advantages of the invention are that the heating coil 23, which can be designed as a helical pipe cartridge, is centered in the steel pipe 22 by the perforated sheet 42 and by means of the seal 24, preferably made of brass, is able to conduct heat well. The sensor pipe 40 is made in particular of high quality steel and is arranged so that it is guided past the heating coil 23 into the bottom region of the hot runner 10. In this way the sensor pipe 40 offers mechanical protection for the connection points 36 to the heat sensor 34 made for example of Fe/CuNi, which detects its temperature by being embedded in the sealing body 24.

The invention is not restricted to the embodiments shown. It can be seen however that a hot runner 10 with an externally heated material pipe 16 and die tip 26 according to the invention has a pre-mounted heating unit 20 with a sealing body 24 which supports a pipe 40 for a heat sensor 34 in a circumferential segment 46. The sealing body 24 made in particular of brass encloses concentrically an insulated heating coil 23 in a steel pipe 22 which heating coil is protected mechanically by a partly sleeve-shaped support element 42. For example, the sensor pipe 40 is mounted in the sealing body 24 and is positively and/or adhesively retained between the edges of peripheral ends of a perforated sheet 42. The steel pipe 22 has a lateral recess 44 for the insertion of the connection points 36 of the heat sensor 34. The material pipe 16 is insertable into the heating unit 20 and is able to conduct heat with its shaft 17 positioned closely against the inner wall 25.

All the features and advantages described in the claims, the description and the drawings, including constructive details and the arrangement of parts can be deemed essential to the invention both in themselves and in the most diverse combinations.

I claim:

1. Hot runner (10) with an externally heated material pipe (16) and a heating system (20) therefor, said material pipe being insertable into a housing (12) and comprising a die tip (26) at a bottom end thereof and a heat sensor (34) guided to said bottom end, whereby the heat sensor and the heating system (20) are provided with lateral electric connection points (36 and 30), characterized in that the heating system comprises a pre-mounted heating unit (20) with a sealing body (24),
   wherein the sealing body (24) is made of brass and concentrically encloses an insulated heating coil (23) inside a steel pipe (22), characterized in that the heating coil (23) is centered in the sealing body (24) by a retaining element (42) having a shape of a partial sleeve.

2. Hot runner according to Claim 1, characterized in that the sealing body (24) supports a sensor pipe (40) accommodating the heat sensor (34) in a circumferential segment (46) thereof.

3. Hot runner according to claim 2, characterized in that the sensor pipe (40) in the sealing body (24) is positively retained between edges of peripheral ends of a perforated sheet (42).

4. Hot runner according to claim 1, characterized in that the heating unit (20) is a pipe body an inner wall (25) of which forms a support wall for a heating coil (23) mechanically protected thereby.

5. Hot runner according to claim 1, characterized in that the steel pipe (22) comprises a lateral recess (44) for the insertion of the connection points (36) of the heat sensor (34).

6. Hot runner according to claim 1, characterized in that the material pipe (16) is insertable into the heating unit (20) so as to conduct heat, a shaft (17) of the material pipe being closely positioned against an inner wall (25) of the heating unit (20).

7. Hot runner according to claim 1, characterized in that the connection points (30, 36) of the heating unit (20) and heat sensor (34) are arranged one above another, thereby providing a plug-in assembly in the housing (12) with an assigned lateral recess (13), the plug-in assembly being insertable in and removable from the housing.

8. Hot runner according to claim 1, characterized in that the heating unit (20) is held by a centering screw (28) or a centering sleeve (29) on the housing (12).

9. Hot runner according to claim 1, wherein said partial sleeve-shaped retaining element surrounds said material pipe and said heating coil surrounds said partial sleeve-shaped element.

10. Hot runner according to claim 1, wherein said partial sleeve-shaped retaining element comprises a perforated sheet.

11. Hot runner according to claim 1, wherein said partial sleeve-shaped retaining element comprises a perforated sheet of copper.

12. Hot runner nozzle (10) comprising:
   an externally heatable feed tube (16) for insertion into a housing (12), the feed tube (16) having at a bottom portion thereof a die tip (26),
   a heating system including a heating means for the feed tube and a heat sensor, the heat sensor (34) approaching the bottom portion of the feed tube,
   a pair of lateral connections (36; 30) for making electrical connection to the heat sensor and the heating means,
   said heating means comprising a sensor pipe (40) for the heat sensor,
   the heating system being designed as a pre-mounted heating unit (20) with a sealing body (24),
   said sealing body enclosing an insulated heating coil (23) inside a steel pipe (22),
   wherein the sensor pipe (40) is accommodated in a chamber formed by a circumferential segment (46) of a perforated sheet metal tube (42).

13. Hot runner nozzle according to claim 12, wherein the heating coil (23) is centered in the sealing body (24) by a partly sleeve-shaped retaining element (42).

14. Hot runner nozzle according to claim 12, further comprising an outer steel pipe (22) having a lateral recess (44) for the connections (36) to the heat sensor (34).

15. Hot runner nozzle according to claim 12, wherein the sensor pipe (40) is positively retained in the sealing body (24) between edges of peripheral ends of the perforated sheet metal tube (42).

16. Hot runner nozzle according to claim 12, wherein the sealing body comprises an inner wall (25) for supporting and for providing mechanical protection of the heating coil (23).

17. Hot runner nozzle according to claim 12, wherein the feed tube (16) is heat-conductively insertable into the heating system with a close positioning of a shaft (17) thereof against an inner wall (25) of the sealing body (24).

18. Hot runner nozzle according to claim 12, wherein housing (12) includes an assigned lateral recess (13), the lateral connections (30, 36) to the heating means (20) and heat sensor (34) being arranged on top of one another so as to form a plug-in assembly in the lateral recess (13) of housing (12).

19. Hot runner nozzle according to claim 12, wherein the heating means (20) is held on the housing (12) by one of a centering screw (28) and a centering sleeve (29).

* * * * *